(12) United States Patent
Haberl et al.

(10) Patent No.: US 7,125,065 B2
(45) Date of Patent: Oct. 24, 2006

(54) TOP FOR A CONVERTIBLE VEHICLE

(75) Inventors: Franz Haberl, Wallerfing (DE); Klaus Obendiek, Passau (DE)

(73) Assignee: Edscha Cabrio-Dachsystems GmbH, Hengersberg (DE)

( * ) Notice: Subject to any disclaimer, the term of this patent is extended or adjusted under 35 U.S.C. 154(b) by 0 days.

(21) Appl. No.: 11/157,373

(22) Filed: Jun. 21, 2005

(65) Prior Publication Data
US 2006/0006691 A1    Jan. 12, 2006

(30) Foreign Application Priority Data
Jun. 25, 2004   (DE) .................... 10 2004 030 882

(51) Int. Cl.
*B60J 7/20* (2006.01)
(52) U.S. Cl. ................ 296/107.08; 296/107.06; 296/107.16; 296/136.06
(58) Field of Classification Search .......... 296/107.06, 296/107.08, 107.09, 107.16, 107.17, 135, 296/136.04, 136.05, 136.06
See application file for complete search history.

(56) References Cited

U.S. PATENT DOCUMENTS

| 6,217,104 | B1 * | 4/2001 | Neubrand | 296/107.08 |
| 6,722,723 | B1 | 4/2004 | Obendiek | 296/107.08 |
| 6,832,804 | B1 * | 12/2004 | Eichholz et al. | 296/107.08 |
| 6,863,333 | B1 * | 3/2005 | Heller et al. | 296/107.09 |
| 2002/0135201 | A1 | 9/2002 | Liedmeyer et al. | 296/107.17 |
| 2003/0080581 | A1 | 5/2003 | Quindt | 296/136 |
| 2005/0077751 | A1 * | 4/2005 | Guillez et al. | 296/107.08 |
| 2005/0242613 | A1 * | 11/2005 | Mori et al. | 296/107.08 |

FOREIGN PATENT DOCUMENTS

| DE | 196 37 038 | 1/1998 |
| DE | 100 39 682 | 3/2002 |
| DE | 101 46 267 | 4/2003 |

\* cited by examiner

*Primary Examiner*—Jason Morrow
(74) *Attorney, Agent, or Firm*—Davidson, Davidson & Kappel, LLC

(57) ABSTRACT

A top for a convertible vehicle, the top including a storage space for storing the top in an opened state of the top, an essentially shape-preserving covering member for covering the storage space in a closed state of the top, and a rear top section. The top section is arranged at least partially above the storage space in the closed state of the top, and the covering member is connected to the rear top section by at least one connecting member. Movement of the top section can move the covering member via the connecting member.

16 Claims, 4 Drawing Sheets

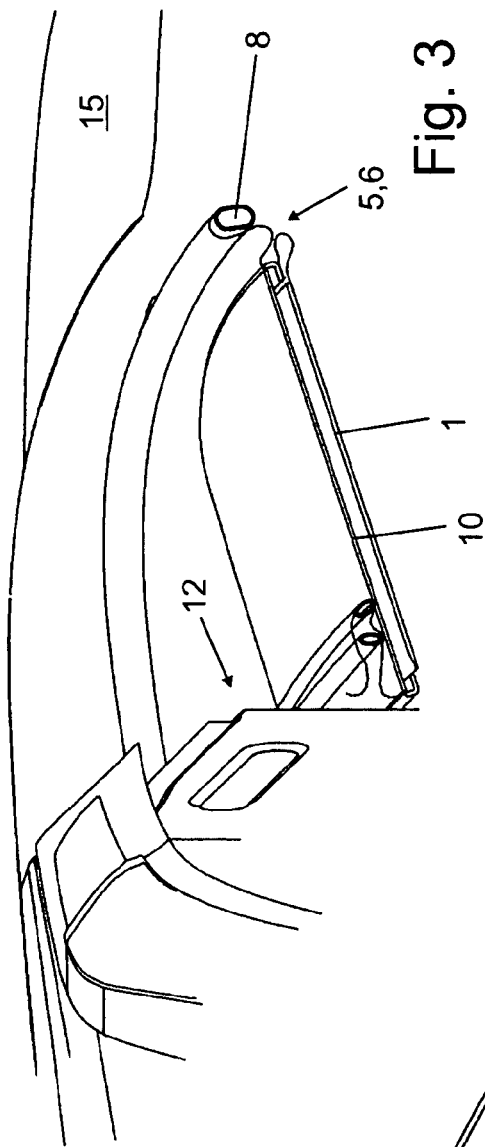
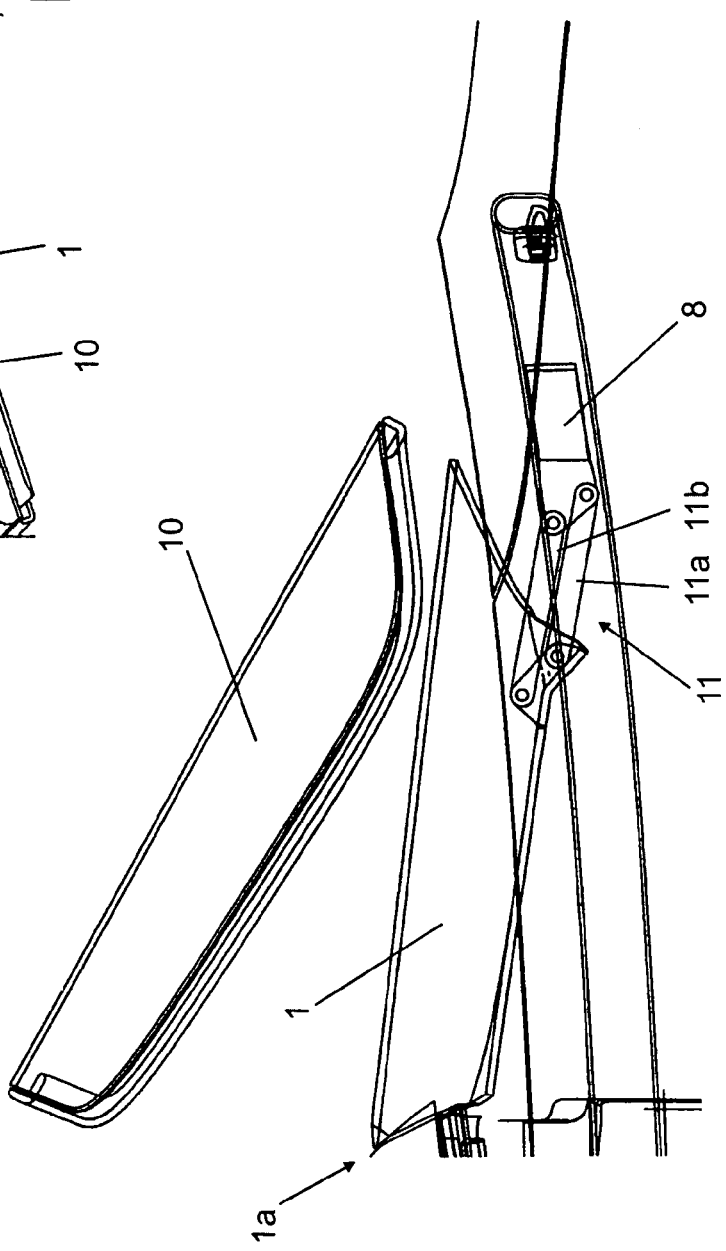

TOP FOR A CONVERTIBLE VEHICLE

Priority is claimed to German Patent Application 10 2004 030 882, filed on Jun. 25, 2004, the entire disclosure of which is incorporated by reference herein.

BACKGROUND OF THE INVENTION

The present invention relates to a top for a convertible vehicle, and in particular a top comprising a storage space for storing the top in an opened state of the top, an essentially shape-preserving covering member for covering the storage space in a closed state of the top, and a rear top section, wherein the top section is arranged at least partially above the storage space in the closed state of the top.

It is known to store openable tops for convertible vehicles in an opened state of the top in a vehicle storage space generally arranged on the rear side. The storage space should also be upwardly covered in the closed state of the top. This means that an open cavity which firstly does not have an attractive appearance and secondly conceals the risk of, for example, children being able to throw objects into the storage space during the journey, does not remain.

From the construction of convertible tops, it is known to cover the storage space by means of a separately driven, movable lid element. Such a separately movable lid element may be coupled, for example, to a rear top-compartment lid and is generally provided with its own driving device.

German patent application DE 101 46 267 A1 describes a top for a convertible vehicle, with a storage space for the top, wherein the top comprises three roof parts, the storage space being covered by a tailgate and at least partially also by an essentially shape-preserving covering member designed as a covering element, and a rear top section, in particular a rear window arranged in the rear roof part, being arranged at least partially above the storage space in a closed state of the top. The covering element is coupled to a rear side of a seat and therefore to the body of the vehicle by means of a four-bar-linkage arrangement, with one of the joints of the four-bar linkage being guided in a longitudinally displaceable manner on the covering element. A first force-application unit, comprising an electric motor, a gear and a driving cable, is arranged on the covering element. It is a disadvantage that both, the four-bar-linkage arrangement and the force-application unit, take up a space which was designated for the top. A disadvantage of arranging the force-application unit on the covering element is that the force-application unit not only has to support the covering element but also in addition its own weight against the body.

German patent document DE 196 37 038 C1 describes a covering for a linkage passage opening of a linkage for a top of a convertible, where the linkage passage opening is to be covered by an elastic element, especially a tightening strap. The tightening strap is fastened to a retaining element, it being possible for the retaining element to be lowered and therefore for the linkage passage opening to be closed. A disadvantage is that the tightening strap, although suitable as a covering for a small opening, such as a linkage passage opening, is not, however, suitable for covering a storage space of a top, in particular just because of the fact that very great stretching forces are required for this. A further disadvantage is that the retaining element causes the overall arrangement will become quite complex.

SUMMARY OF THE INVENTION

It is an object of the invention to provide a top for a convertible vehicle which allows that a covering of the storage space in the closed state of the top is realized in a simple and cost-effective manner.

It is a further object of the present invention to provide a top for a convertible vehicle with the top requiring no further mechanical control units or driving devices are required for moving the covering member.

It is a still futher object of the invention to provide a top for a convertible vehicle which does not require, in the course of an opening movement of the top, an operator to manually remove the covering member.

It is a still futher object of the invention to provide a top for a convertible vehicle which is particularly useful for conventional types of tops which do not have a top-compartment lid covering the storage space or in which such a lid only partially covers the storage space.

It is a still further object of the present invention to provide a top for a convertible vehicle which provides an optically appealing appearance in connection with a good functionality.

According to the invention, these and other objects are achieved for a top comprising a storage space for storing the top in an opened state of the top, an essentially shape-preserving covering member for covering the storage space in a closed state of the top, and a rear top section, the top section being arranged at least partially above the storage space in the closed state of the top, wherein the covering member is connected to the rear top section via at least one connecting member, and wherein the covering member is movable by means of the connecting member by way of a movement of the top section.

Since the covering member is connected to the rear top section via the connecting member makes it becomes possible for a pivoting of the covering member to be integrated into an opening movement of the top, so that no further mechanical control units or driving devices are required for moving the covering member.

Due to the connection of the covering member to the rear top section of the top, it is particularly advantageous that, in the course of a top-opening movement, the covering member is automatically displaced in the storage space, thus releasing an operator from a manual removal of the covering member.

The coupling of the covering member to the rear top section can be turns out to be a particular advantage in the case of types of top which do not have a top-compartment lid covering the storage space or in which such a lid only partially covers the storage space. These are in particular conventional types of top, in which the opened top is protected by means of an additional tarpaulin, and types of top in which, in the opened state, a region of the top that is designed as a rigid shell part forms a covering over the stored top.

In an advantageous refinement of the present invention, the rear top section comprises a rear lateral roof pillar of the top, in particular a part of a provided inside roof lining of the top being advantageously arranged in front of the rear lateral roof pillar in the closed state of the top, and the connecting member comprising the part of the inside roof lining. By this means, the covering member is advantageously integrated both optically and also functionally in an inside lining of the top. As an alternative and/or in addition to the connection to the part of the inside roof lining, a connecting member may also be provided in the form of tension straps which may advantageously also run behind the inside roof lining.

In a preferred embodiment, it is provided that the rear top section comprises a tensioning blow of the top, it being possible for the covering member to be clamped against the tensioning bow by the connecting member. This also enables a clamped retention of the covering member, in particular in the longitudinal direction of the vehicle, in a simple manner. The connecting member may preferably be composed of a continuous flexible strip.

Provision may also preferably be made for the rear top section to comprise an inclined rear top surface, the covering member, in particular, being held on the inclined top surface by means of the connecting member. This enables a movable means of securing the covering member, in particular in the vertical direction. The connecting member for connection to the inclined top surface may particularly preferably be a continuous strip of material. The inclined top surface may also preferably comprise a rigid rear window of the top, with the result that, if appropriate, the connecting member can advantageously be fixed on a lower frame of the rigid rear window.

In the case of the connecting member being fixed on the lower frame of the regid rear window, the rigid rear window may rest directly on the covering member in the opened state of the top. This ensures a particularly space-saving storage of the rear window and covering member, with the rear window additionally being protected by the covering member against damage, for example against scratching, since the covering member is situated below the rear window, with the result that a loading of a boot with objects cannot lead to any contact with the surface of the rear window. Furthermore, in a preferred embodiment of a top according to the invention, provision may be made for the covering member to be connected to the top in an articulated manner, the connection of the covering member to the tensioning bow of the top may in a particularly preferable fashion be provided by a four-bar-linkage arrangement. By this feature, a particularly robust and play-free guidance of the covering member is enabled with only a slightly increased outlay on construction.

Furthermore, it is preferably provided that, in the closed state of the top, a front edge of the covering member bears against and flushes with a rear partition of a passenger compartment of the vehicle. This allows in a simple manner to completely cover the storage space, it being possible for the rear partition of the passenger compartment to be, in particular, the rear side of rear passenger seats, and the covering member corresponding in form and function to a conventional rear parcel shelf of a vehicle.

The covering member in the closed state of the top is particularly preferably held in a longitudinal direction of the vehicle by the connecting member, and the covering member in the closed state of the top is furthermore preferably held in a vertical direction by the connecting member. This makes it possible overall to reliably secure the covering member, with the result that vibration or a movement of the covering member is avoided during the journey.

These and further advantages and features will become apparent from the embodiments described below.

BRIEF DESCRIPTION OF THE DRAWINGS

Preferred embodiments of a top according to the invention are described below and explained in greater detail with reference to the attached drawings.

FIG. 3 shows a three-dimensional sectional view of the top from FIG. 1 in an opened state of the top.

FIG. 6 shows a schematic side view of a second embodiment of a top according to the invention in a closed state of the top.

DETAILED DESCRIPTION OF PREFERRED EMBODIMENTS

Figure 1:
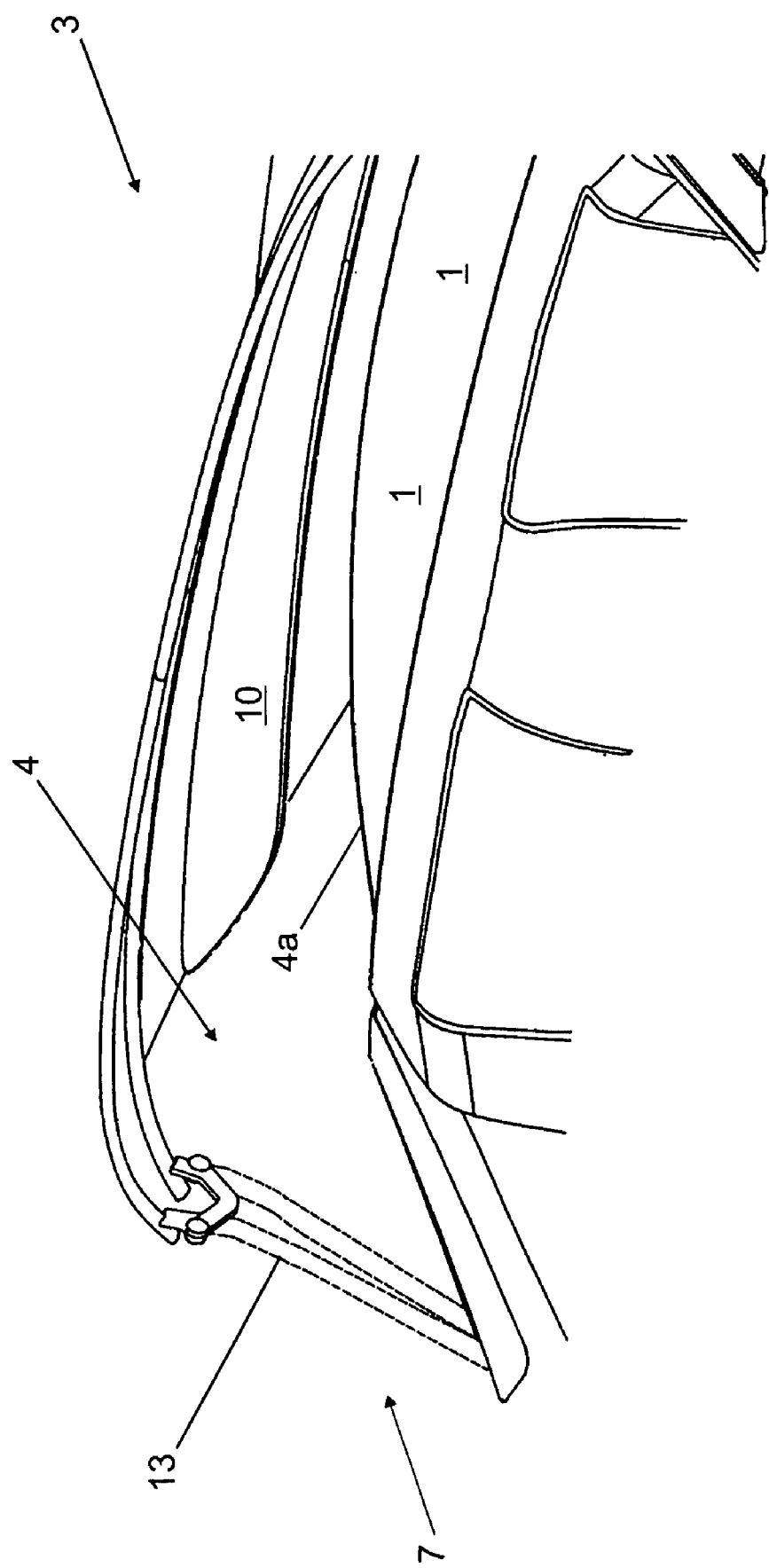
FIG. 1 shows a schematic three-dimensional view of a rear top section of a first embodiment of a top according to the invention in the closed state of the top.

The preferred embodiment of a top according to the invention, as illustrated in the figures, comprises a rear top section 3 (see FIG. 1). The top section 3 comprises regions of lateral rear roof pillars 7, the top being connected, in particular in the region of these pillars, to the vehicle body via a guiding mechanism 13. Furthermore, the top section 3 comprises an inclined rear top surface 9 into which a curved, rigid rear window 10 is fitted by means of a rear window frame 10*a*.

A storage space 2 for the top is situated essentially below the rear top section 3 or below the inclined top surface 9 (see FIG. 2). The storage space 2 for the top is bounded in the direction of travel by the rear sides of rear passenger seats 14 which at the same time form a rear partition 12 of the passenger compartment of the vehicle.

The inclined top surface 9 is closed on the rear side by a rigid, movable tensioning bow 8 which is adjoined on the rear side, in the closed state of the top, by a rear element 15 of the outer vehicle body. In the present embodiment, the tensioning bow 8 is pressed in a sealing manner from below against a front end edge of the rear element 15 in the closed state of the top (see FIG. 2).

The storage space 2 is covered by a shape-preserving covering member 1 in the closed state of the top. The covering member 1 butts with a front edge 1*a* against the rear partition 12, but is not connected fixedly thereto. The overall essentially horizontally aligned covering member 1 is comparable in its orientation, size and arrangement to a rear parcel shelf of a conventional sedan car, which shelf is situated below an oblique rear window and behind the rear passenger seats.

The top according to the invention is lined with an inside roof lining 4 which, in the closed state of the top, forms the inside surface of the top and advantageously conceals linkage parts. In this case, one part of the inside roof lining 4 covers the rear lateral roof pillars 7 of the top (see FIG. 1). A lower rear end edge 4*a* of the inside roof lining part 4 is connected here to a lateral edge of the covering member 1. The covering member 1 is thereby attached to the inside roof lining part 4 and is positioned firstly in the vertical direction and secondly also in the longitudinal direction of the vehicle by means of the tensioned inside roof lining. In this manner, the inside roof lining part 4 forms a connecting member for connecting the covering member 1 to the rear top section 3.

Figure 2:
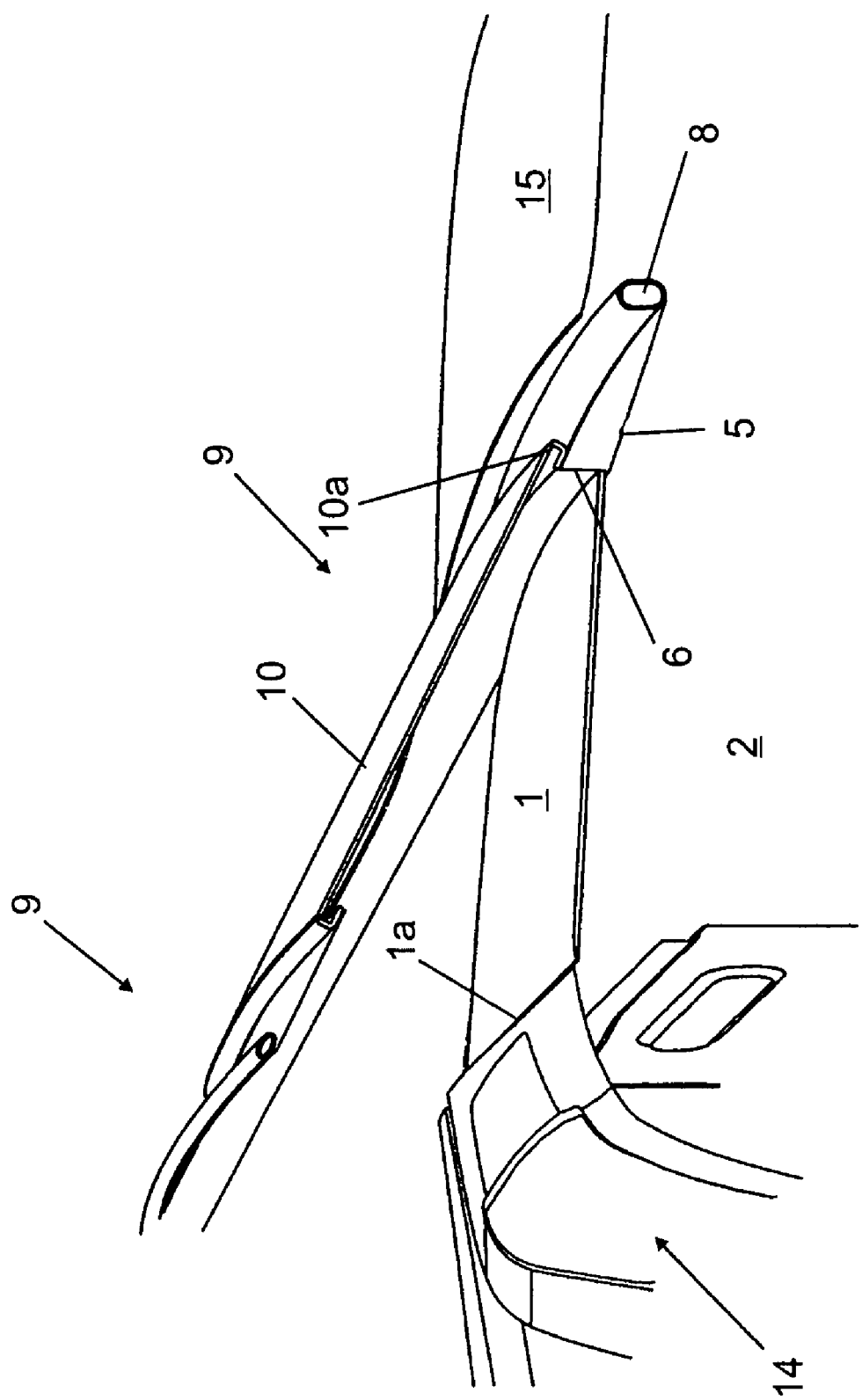
FIG. 2 shows a three-dimensional sectional view of the top from FIG. 1.

In order to improve the tensioned retention of the covering member 1 in the closed state of the top, a rear edge of the covering member 1 is also connected movably to the tensioning bow 8 of the top via a further connecting member 5 (see FIG. 2). In this case, the connecting member 5 is designed as a continuous flexible strip along the rear end edge of the covering member 1.

A further improvement of the tensioned securing of the covering member 1 is ensured by a further connecting member 6 which extends essentially vertically and is designed as a flexible strip which connects a lower edge of a rear window frame 10*a* to the rear end edge of the covering member 1 (see FIG. 2).

If the covering member 1 is approximately considered as a rectangular body, three of the four sides of the covering member 1 are therefore connected in each case continuously to the rear top section 3 of the top via connecting member 4, 5, 6. Overall, this achieves a tensioning securing of the covering member 1 both vertically and in the longitudinal direction of the vehicle and also in the transverse direction of the vehicle.

In addition, in the closed state of the top the covering member 1 is pulled from below by its front end edge 1*a* against a projection 16 of the rear partition 12, as a result of which an even better and more vibration-proof securing of the covering member 1 is ensured.

In the course of an opening movement of the top, the movement introduced by linkage parts supporting the top cause the inside roof lining and therefore the inside roof lining part 4 to relax, as a result of which the covering member 1 is lowered into the storage space 2. In the present type of top, the tensioning bow 8 is also lowered to some extent into the storage space 2, as a result of which further lowering of the covering member 1 takes place (see FIG. 3).

As is apparent from the illustration of the opened state of the top in FIG. 3, the rigid rear window 10 comes to rest substantially on the covering member 1, with the result that the sensitive surface of the rear window 10 is protected from below by the covering member 1.

Figure 4:
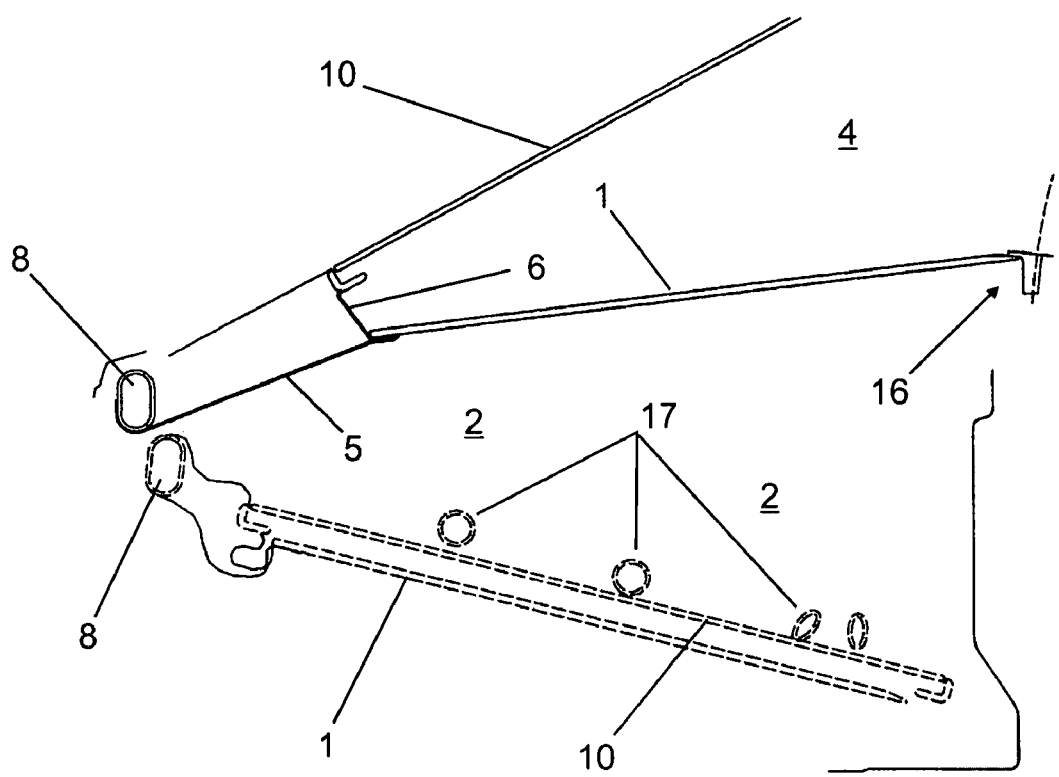
FIG. 4 shows a schematic lateral sectional view of a top according to the invention in a closed state (solid lines) and in an opened state (dashed lines).

The illustration of FIG. 4 shows a lateral sectional view through the rear top section 3, both a closed positioning (solid lines) and an opened positioning (dashed lines) of tensioning bow 8, rear window 10 and covering member 1 being illustrated. FIG. 4 furthermore schematically shows sections through bows 17 of the top that are stored in the opened state of the top.

Figure 5:
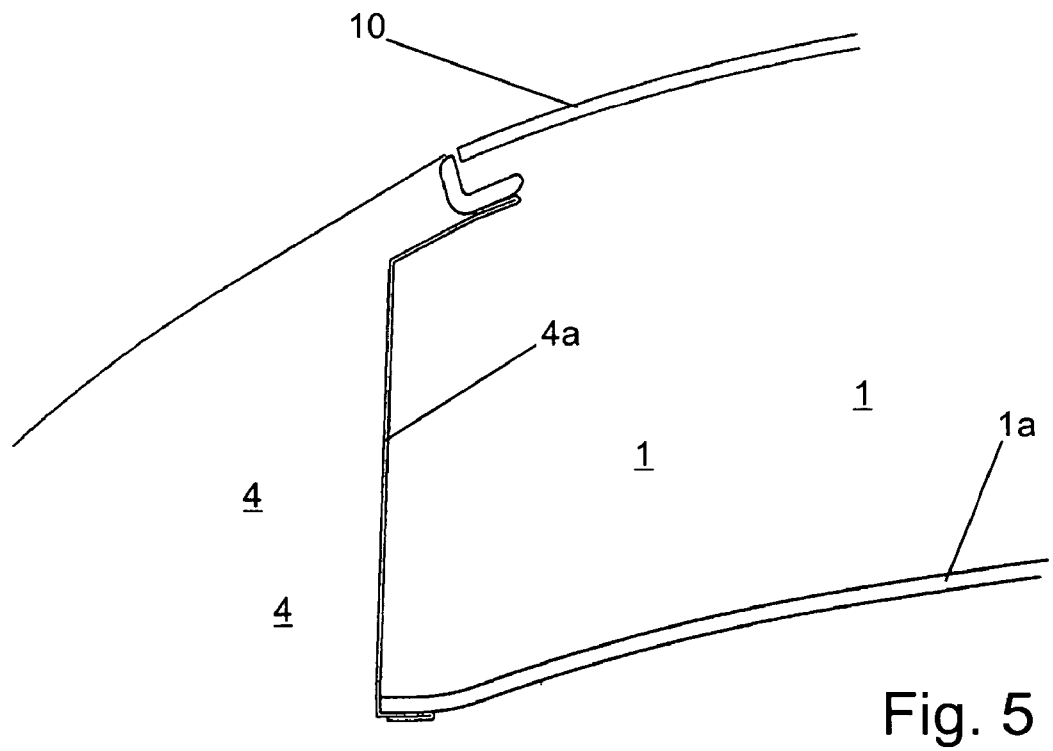
FIG. 5 shows a section in the longitudinal direction of the vehicle through a rear lateral region of a top according to the invention in a closed state of the top.

From the sectional view through the rear top section 3 of the top in the closed state according to FIG. 5, the connection of the inside roof lining edge 4*a* to the covering member 1 can be seen in particular.

FIG. 6 shows a partial illustration of a second preferred embodiment of a top according to the invention. In order to achieve precise positioning and guidance of the covering member 1, the covering member 1 is connected to the rear tensioning bow 8 of the top by means of a four-bar-linkage arrangement 11 (see FIG. 6). The two links 11*a*, 11*b* of the four-bar-linkage arrangement 11 enable here a pivoting of the covering member 1 in relation to the tensioning bow 8, by means of which the covering member 1 is precisely defined in its movement in particular during an opening or closing movement of the top. A connecting member between rear top section 3 and covering member 1 is therefore also formed by the four-bar-linkage arrangement 11. However, this connecting member 11 will generally be combined with other connecting member described in the first embodiment, in particular with the inside roof lining part 4, in order to enable the top to be automatically stored.

What is claimed is:

1. A top for a convertible vehicle, the top comprising:
   a storage space for storing the top in an opened state of the top,
   an essentially shape-preserving covering member for covering the storage space in a closed state of the top, and
   a rear top section, the top section being arranged at least partially above the storage space in the closed state of the top,
   wherein the covering member is connected to the rear top section via at least one connecting member,
   wherein the covering member is movable by means of the connecting member by way of a movement of the top section,
   wherein the rear top section comprises a rear lateral roof pillar of the top, and
   wherein an inside roof lining is provided for the top, with a first part of the inside roof lining being arranged in front of the rear lateral roof pillar in a closed state of the top, the connecting member comprising the first part of the inside roof lining.

2. The top as recited in claim 1, wherein, in the course of a top-opening movement, the covering member is automatically stored in the storage space.

3. A top for a convertible vehicle, the top comprising:
   a storage space for storing the top in an opened state of the top,
   an essentially shape-preserving covering member for covering the storage space in a closed state of the top, and
   a rear top section, the top section being arranged at least partially above the storage space in the closed state of the top,
   wherein the covering member is connected to the rear top section via at least one connecting member,
   wherein the covering member is movable by means of the connecting member by way of a movement of the top section, and
   wherein the rear top section comprises a tensioning bow of the top, it being possible for the covering member to be clamped against the tensioning bow by the connecting member.

4. The top as recited in claim 1, wherein the rear top section comprises an inclined rear top surface.

5. The top as recited in claim 4, wherein the covering member is held on the inclined top surface by means of the connecting member.

6. The top as recited in claim 4, wherein the inclined top surface comprises a rigid rear window of the top.

7. The top as recited in claim 1, wherein the rear top section comprises an inclined rear top surface, a rigid rear window of the top, the rigid rear window resting directly on the covering member in the opened state of the top.

8. The top as recited in claim 1, wherein the covering member is connected to the top in an articulated manner.

9. The top as recited in claim 8, wherein the rear top section comprises a tensioning bow of the top, with the covering member being connected to the tensioning bow of the top via a four-bar-linkage arrangement.

10. The top as recited in claim 1, wherein, in the closed state of the top, a front edge of the covering member bears against and flushes with a rear partition of a passenger compartment of the vehicle.

11. The top as recited in claim 1, wherein the covering member, in the closed state of the top, is held in a longitudinal direction of the vehicle by the connecting member.

12. The top as recited in claim 1, wherein the covering member in the closed state of the top is held in a vertical direction by the connecting member.

13. A top for a convertible vehicle, the top comprising:
a storage space for storing the top in an opened state of the top,
an essentially shape-preserving covering member for covering the storage space in a closed state of the top, and
a rear top section, the top section being arranged at least partially above the storage space in the closed state of the top,
wherein the covering member is connected to the rear top section via at least one connecting member,
wherein the covering member is movable by means of the connecting member by way of a movement of the top section, and
wherein the connecting member comprises a four-bar-linkage arrangement connecting the rear top section and the covering member.

14. A top for a convertible vehicle, the top comprising:
a storage space for storing the top in an opened state of the top,
an essentially shape-preserving covering member for covering the storage space in a closed state of the top, and
a rear top section, the top section being arranged at least partially above the storage space in the closed state of the top,
wherein the covering member is connected to the rear top section via at least one connecting member,
wherein the covering member is movable by means of the connecting member by way of a movement of the top section, and
wherein a front edge of the covering member butts with a bottom edge of a rear partition of the passenger compartment of the convertible vehicle in the closed state of the top.

15. A top for a convertible vehicle, the top comprising
a storage space for storing the top in an opened state of the top,
an essentially shape-preserving covering member for covering the storage space in a closed state of the top, and
a rear top section, the top section being arranged at least partially above the storage space in the closed state of the top,
wherein the covering member is connected to the rear top section via at least one connecting member,
wherein the covering member is movable by means of the connecting member by way of a movement of the top section, and
wherein the connecting member is provided in the form of tension straps.

16. The top as recited in claim 15, wherein the top further comprises an inside roof lining, the tension straps running behind the inside roof lining of the top.

* * * * *